(12) United States Patent
Mayor et al.

(10) Patent No.: US 10,861,084 B1
(45) Date of Patent: Dec. 8, 2020

(54) METHOD AND COMPUTER-READABLE MEDIA FOR REAL-TIME IMAGE-BASED CATALOG SEARCH

(71) Applicant: Coupa Software Incorporated, San Mateo, CA (US)

(72) Inventors: Chris Mayor, Menlo Park, CA (US); Fang Chang, Mountain View, CA (US); Rahul Mehta, San Mateo, CA (US); Maggie Mae Joy, Crownsville, MD (US); Jeffrey Hellman, Albuquerque, NM (US); Thomas Klein, Habsheim (FR)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 16/593,198

(22) Filed: Oct. 4, 2019

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0623* (2013.01); *G06Q 30/0625* (2013.01); *G06Q 30/0631* (2013.01); *G06Q 30/0633* (2013.01); *G06Q 30/0641* (2013.01)

(58) Field of Classification Search
CPC . G06Q 30/0601–0645; G06Q 30/0643; G06Q 30/0633; G06Q 30/0631; G06Q 30/0641; G06Q 30/0625; G06Q 30/0623
USPC ........ 705/26.1–27.2, 26.8, 26.7, 27.1, 26.62, 705/26.61
See application file for complete search history.

(56) References Cited

U.S. PATENT DOCUMENTS

| | | | |
|---|---|---|---|
| 2008/0082426 A1* | 4/2008 | Gokturk | G06Q 30/0625 705/26.62 |
| 2008/0152231 A1* | 6/2008 | Gokturk | G06K 9/46 382/209 |
| 2010/0114733 A1* | 5/2010 | Collas | G06Q 20/12 705/26.1 |
| 2014/0100991 A1* | 4/2014 | Lenahan | G06Q 30/0625 705/26.62 |
| 2014/0337176 A1* | 11/2014 | Ruvini | G06Q 30/0625 705/26.62 |
| 2017/0098124 A1* | 4/2017 | Jonsson | G06K 9/6201 |
| 2018/0341907 A1* | 11/2018 | Tucker | G06K 9/00671 |
| 2018/0373719 A1* | 12/2018 | Valliani | G06F 16/24578 |
| 2019/0251446 A1* | 8/2019 | Fang | G06F 16/51 |

OTHER PUBLICATIONS

Perez, Sarah. Redesigned Google Shopping Goes Live, with Price Tracking, Google Lens for Outfits and More. Oct. 3, 2019 (Oct. 3, 2019). Techcrunch.com (Year: 2019).*

* cited by examiner

*Primary Examiner* — Jeffrey A. Smith
*Assistant Examiner* — Allison G Wood
(74) *Attorney, Agent, or Firm* — Baker Botts L.L.P.

(57) ABSTRACT

A method and apparatus for generating search data for items in an e-procurement system is provided. In various embodiments, a digital image is created or selected and data comprising search key data is generated based on the digital image. In various embodiments, the search key data is sent to a search repository listing items in an e-procurement system. In various embodiments, search data is sorted according to received search key data to present search results relating to items corresponding to the digital image.

20 Claims, 10 Drawing Sheets

METHOD AND COMPUTER-READABLE MEDIA FOR REAL-TIME IMAGE-BASED CATALOG SEARCH

FIELD OF THE DISCLOSURE

One technical field of the present disclosure is distributed computer systems in the field of electronic procurement including computer-implemented processes for facilitating requisition transactions on mobile platforms. Another technical field is computer database management systems including the generation of search queries using electronic digital images and image data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

E-procurement technologies may relate to any digital or electronic marketplace whereby buyers and suppliers interact to participate in the exchange of items for compensation. E-procurement may involve direct interaction between an individual buyer and an individual seller or supplier, or may involve one or more intermediary parties. For example, procurement may refer to a process whereby a buyer member of an organization submits a requisition or purchase order through an employing entity who will approve the transaction and purchase an item from a seller on behalf of the buyer member. Such procurements may utilize a third-party intermediary or application to allow communication between buyers and sellers to facilitate smooth e-procurements.

E-procurement may take place in the electronic marketplace through digital applications whereby a buyer utilizing the digital application may search for a digital offer or item on a digital catalog. The digital catalog may be list or grouping of offers or items which are offered by a specific seller, which are available to a specific buyer, or which are subject to the e-procurement process according to a third party which maintains the digital application and/or electronic marketplace. A buyer may interact with a graphical user interface on the digital application in order to identify an item sought by the buyer for procurement. Electronic marketplaces having vast quantities of items available through various catalogs must therefore diligently maintain large amount of data relating to each item while facilitating efficient buyer search methods to identify specific items.

One problem with e-procurement procedures in a vast electronic marketplace involves the sheer quantity of items available to a user. Buyers seeking highly specific items for procurement must have personal information available to engage with a specific search method to more easily find sought items. Such search procedures are subject to various stages of human error. For example, a buyer may only have a general description personally available for an item they want to procure through the digital application. As a result, vague search terms are used which return vast number of items matching the vague descriptions and the buyer must search through multiple incorrectly searched items to find a specific correct item.

Even if a user has specific search terms available for their consideration, a user may not readily recall those terms or have all necessary terms available to them at the time a search is performed. As a result, specific items are still difficult to find in a vast electronic marketplace. Worse still, if a buyer performs a search for items comprising terms that the buyer does not understand or which have been relayed to the buyer through another entity, the buyer may be misled and search for incorrect items or items which do not fit the needs of the buyer.

Human error also may occur during manual entry of search terms by a user. A user misspelling or a user's failure to a speak a language required to procure an item may result in a user searching needlessly through a digital catalog for an item when the remedy may be as simple as using a translated term or fixing a spelling mistake. User error in e-procurement search and transaction processes harm every entity involved in procurement operations. A buyer may spend unnecessary time searching for an item when a more efficient search process or catalog may find the sought item faster. A seller risks losing sales because of time and resource waste when a buyer cannot find a sought item. Third party facilitators of the electronic marketplace a detrimentally affected when digital applications and data pipelines are clogged with unnecessary search traffic, electronic processor waste and individual requests from buyers seeking help with a procurement.

SUMMARY

The appended claims may serve as a summary of the invention.

DETAILED DESCRIPTION

Figure 1:
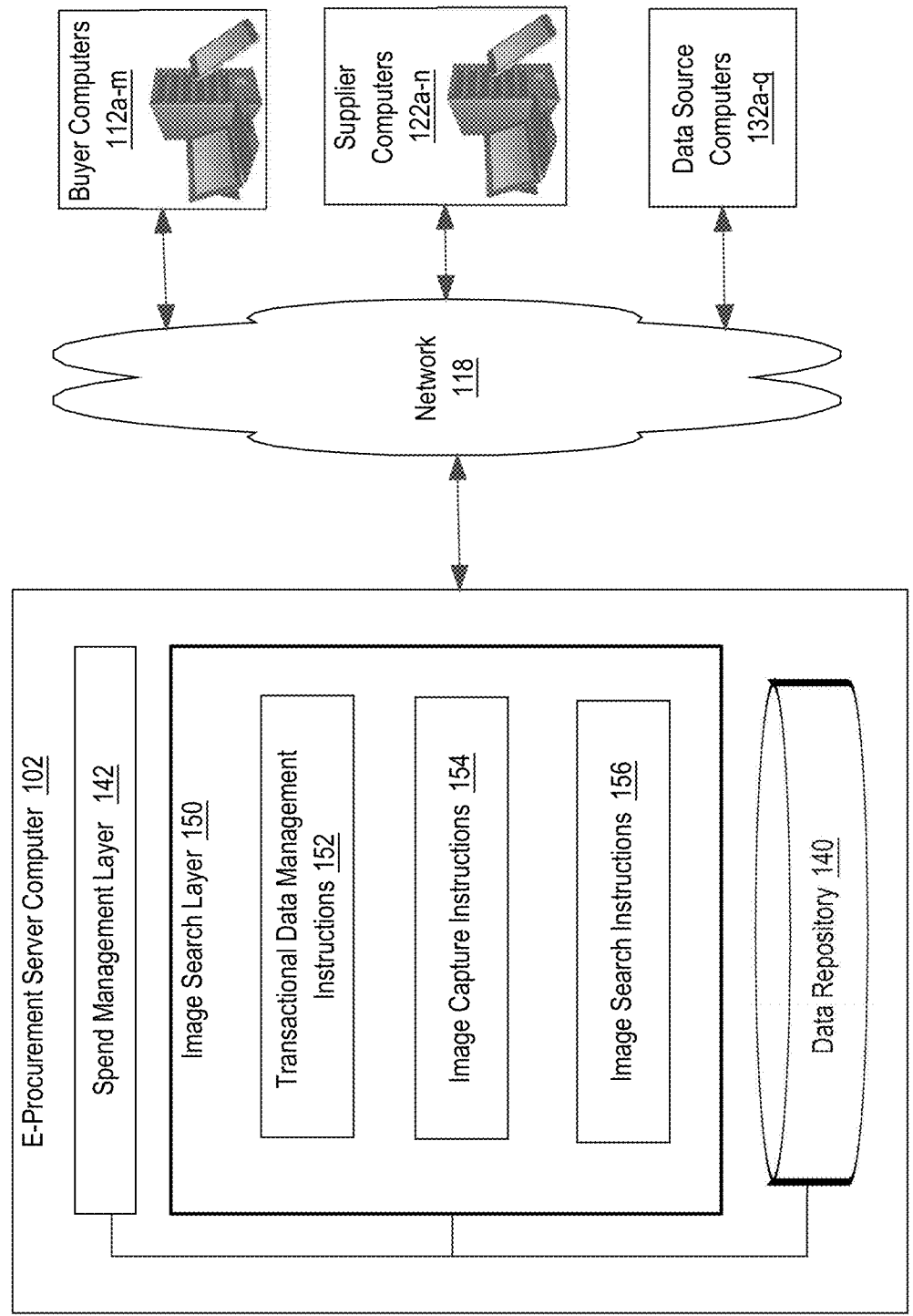
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, a mobile digital application search aid may convert specific representations of sought items from a buyer and perform a corresponding search in an electronic marketplace to aid the buyer in the e-procurement process. As discussed herein buyers manually entering search terms and fields is a dangerously inefficient process, however, most buyers have access to digital photographs or likenesses of the sought items, either through finding such representations through information networks or by having copies of the physical objects sought on hand. Converting the digital likenesses of the items into readily available digital search data and performing a corresponding search on the digital search data may yield more numerous search matches for buyers and decrease resource drains on third party electronic marketplace facilitators.

The addition of a mobile requisitions digital process may allow e-procurements to proceed in a timely fashion for buyers and sellers alike, with reduced use of CPU cycles, memory, storage and other computer resources. Requisitions are procurements whereby a supervising or administrator entity of the buyer is given the opportunity to approve or disapprove of a buyer's procurements before the transaction with the seller is complete. By combining the visual search process described herein with a mobile requisitions application, buyers, sellers, and facilitators of the electronic marketplace may experience beneficial gains to time and computer resource management when utilizing the e-procurement process.

In various embodiments, a computer-implemented method is utilized to receive, by a computing device, an item image that comprises image data comprising, in a digital format, a visual representation of a physical item. The visual representation may a digital picture of a physical object or other two-dimensional visual data depicting a physical object. The visual representation may be in a digital format capable of conveying properties of the physical object to a user or a computer, and may include, but is not limited to, a Joint Photographic Experts Group file (JPEG), a Portable Network Graphics file (PNG), a vector graphics file, a rasterized image, a digital photograph taken from a digital camera, and/or a digital array of multiple pixel datum. The image includes a representation of the item the user wishes to procure, and may be taken contemporarily, taken from storage in a computer device, or taken from a cache storing previous search data relating to items for procurement.

The computer-implemented method may be utilized to determine, based on the item image, digital data comprising one or more search keys, the one or more search keys being associated with one or more aspects of the image data of the visual representation of the commercial item. The search keys are generated automatically based on the received item image and represent a collection of searchable terms which efficiently match properties of the item image. The one or more aspects of the image data may related to various digital image properties, such as groupings of pixels, shade-based numerical values of pixels in a digital image, patterns of color or color groupings, or any other aspects sufficient to describe one of more aspects of the physical item as taken from the visual representation. The one or more search keys may be one or more data values which are capable of processing by a search engine or search entity in order to return search data from a data repository and may be composed of character strings, Boolean values, recognized trade names, search categories, or any other search data sufficient to convey, to a search engine, one or more aspects of the physical item.

The computer-implemented method may be utilized to send, to a database programmed for storing information associated with a plurality of physical items, the one or more search keys. The database may include information relating to items available for procurement or requisition in an electronic marketplace. The items information stored in the database may correspond to specific search keys and identified based on the types of search keys received.

The computer-implemented method may be utilized to receive, from the database, based on the one or more sent search keys, search result data associated with a subset of the plurality of physical items. The search result data relates to a number of items available in the electronic marketplace for procurement and identified by the corresponding received search keys. The search data may be in any format sufficient to convey a list or aspect of items relating to search results gleaned from the one or more sent search keys, including a LinkedList, character string, search map, web page, Hypertext Markup Language link, or any other formatted data related to a listings of items in a search database.

The computer-implemented method may be utilized to generate, based on the search result data, a list of physical items from the subset of the plurality of physical items. The list will be viewable by the buyer to determine the results of the search that were gleaned based on the image data supplied by the buyer in the initial step. The list may be any list presentable to a user to convey the returned data from the search database, including a products list database, a visual shopping list, a product information screen, a digital offer, or any other applicable format and/or visual representation.

The computer-implemented method may be utilized to cause displaying, on the computing device, the list of physical items. The display may be done on a visual digital display on a user device such as a user device implementing a digital application for e-procurement and requisition. The viewing of the list allows the buyer to engage in procurement or requisition processes by readily identifying sought items from the search result data.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122a-n, one or more buyer computers 112a-m, and one or more data source computers 132, which are communicatively coupled directly or indirectly via one or more networks 118. The designation "122a-n" indicates that any number of supplier computers may be used in various embodiments. "Supplier," in this context, may also mean "seller" in some embodiments. The designation "112a-m" indicates that any number of buyer computers may be used in various embodiments.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112a-m and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises an image search layer 150 that is programmed or configured to host or execute functions including but not limited to generating search result data for a particular digital image of a procurable item.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the image search layer 150 can comprise computer-executable instructions, including transactional data management instructions 152, image capture instructions 154, and image search instructions 156. In addition, the server 102 can comprise a database module 140.

In some embodiments, the transactional data management instructions 152 enable collecting and transmitting transactional data or documents, such as catalogs, purchase requisitions, purchase orders, or invoices, between supplier computers and buyer computers and maintaining the transactional data in memories. Specifically, the transaction data management instructions 152 enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the image capture instructions 154 enable the capturing or receiving or digital image data to be used as part of the search process. Specifically, the image capture instructions 154 enable capture of physical scenes of items either through a contemporary utilizing of a digital camera or the transmission of image data between one or more computing devices. After the digital image is received, the image capture instructions 154 may cause the generation of search terms from the properties of the digital image to be used as part of a search process for procurable items.

In some embodiments, the image search instructions 156 enable the generation of a search for such procurable items in the electronic marketplace. These searches may include the search terms devised by image capture instructions 154. The image search instructions 156 may send to another entity, such as supplier computers 122*a-n* or data source computer 132*a-q*, the search terms in order to query for data relating to procurable items.

In some embodiments, the database module 140 is programmed or configured to manage relevant data structures and store relevant data for functions performed by the server 102. In association with the image search layer 150, the data may include image data relating to one or more aspects of a digital image or properties of an item having a representation in the digital image.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132*a-q* broadly represents one or more computers, virtual computing instances, and/or instances of a data management application program with a communication interface. A data source computer 132*a* is programmed to manage one or more data sources, receive a request for certain data in the one or more data sources from the server 102, and send a response to the request to the server 102. The data source computer 132a can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the image search layer 150, the server 102 is programmed to receive or transmit image search data, such as past search terms or digital image data. In other embodiments, the server 102 is programmed to receive or transmit additional transactional data, such as expense reports, from or to one of the buyer computers 112a-112m representing an organization and another one of the buyer computers 112a-112m representing an entity, and similarly from or to one of the supplier computers 122a-112n representing an organization and another one of the supplier computers 122a-122n representing an entity. The server 102 is programmed to also store such transactional data in association with the appropriate accounts in a storage device, such as the data repository 140. Such transactional data may include terms of an early payment discount offered by a supplier account to a buyer account. The server 102 is programmed to further receive additional data from the data source computers 132a-q that can be used to assess the transactional data communicated between one of the supplier computer 122a-n and one of the buyer computers 112a-m. The additional data may include industry-wide prices of certain items sold by a supplier account or annual revenue or spending data associated with a buyer account. The server 102 is programmed to also store such additional data in a storage device, such as the data repository 140.

In some embodiments, periodic or manually programmed or initiated recommendations for catalog modifications may be made by the server 102 and sent to a supplier account.

3. Example Processes

Figure 2:
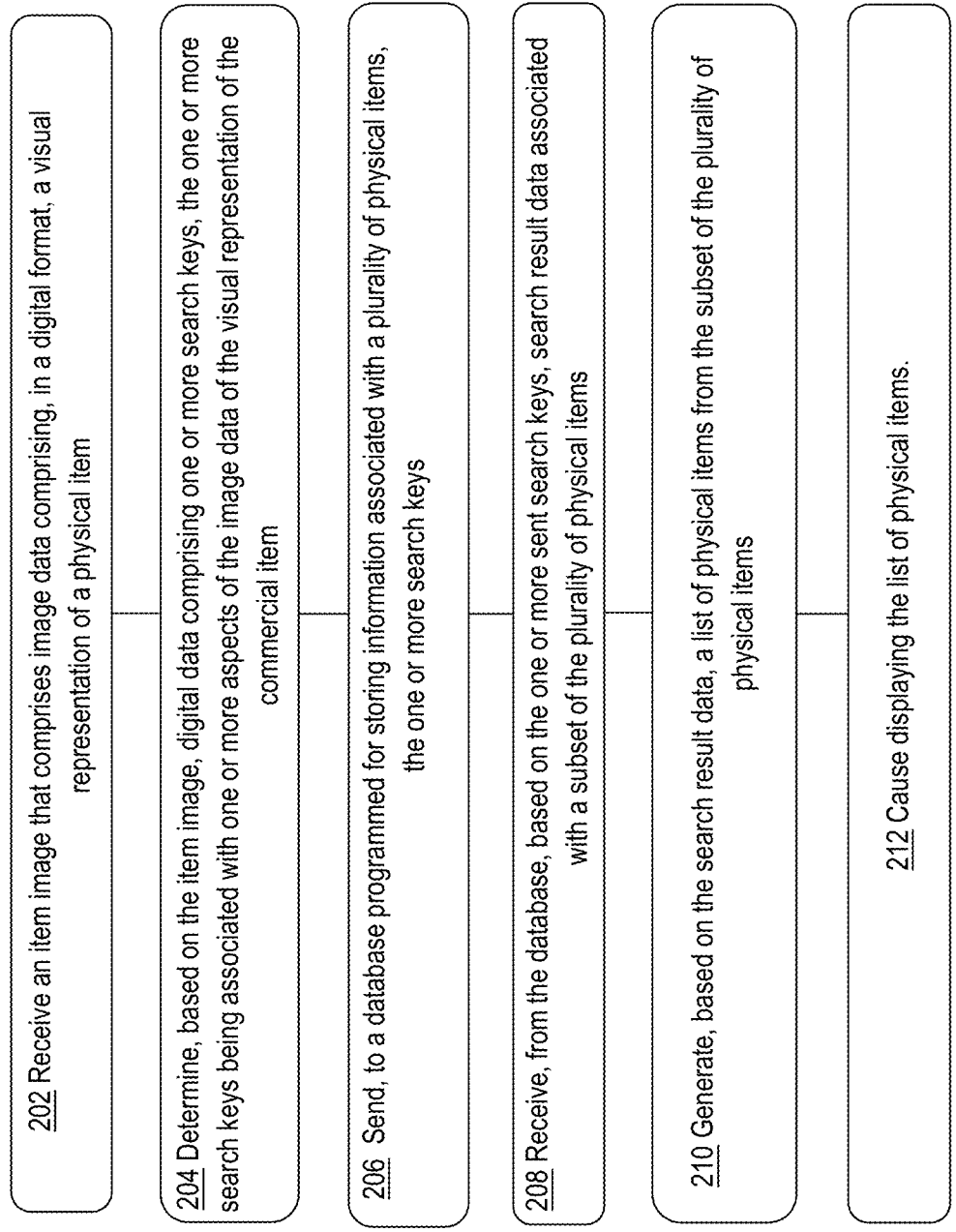
FIG. 2 illustrates a digital image search process according to various embodiments.

FIG. 2 illustrates an example process performed by the e-procurement server 120 computer for performing searches for procurable items on a mobile digital application. FIG. 2 is shown in simplified, schematic format for purposes of illustrating a clear example and other embodiments may include more, fewer, or different elements connected in various manners. FIG. 2 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The example process depicted in FIG. 2 starts with the reception of an item image representing a physical item according to a digital format, such as a photograph. Based on the item image, one or more search keys are determined, the search keys generated in order to perform a search in an electronic marketplace for procurable items similar to the items depicted in the item image. The search keys are sent to a database storing information relating to the procurable items in order to perform a search for the similar items. The database processes the one or more search keys and returns search result data associated with a plurality of procurable items as a result of the search performed with the one or more search keys. Based on the received search result data, a listing of the procurable items is generated for a user, and the list is presented visually to a user to aid in requisition or procurement procedures.

Returning to step 202, according to various embodiments, the server 102 is programmed or configured to receive, by a computing device, an item image that comprises image data comprising, in a digital format, a visual representation of a physical item. In various embodiments, receiving the item image comprises receiving data or electronic signals relating to one or more digital image items which will be the subject of a search for procurable physical items. In various further embodiments, receiving the data or electronic signals may be performed through network 118 and between any of the computing devices or environments described herein.

In various embodiments, the item image is a digital image such as a digital photograph, an electronic copy of a physical photograph, a digital scanning of a physical document including physical images, a digital offer or advertisement, or any other image relating to a physical item which may be the subject of procurement or requisition procedures. In various embodiments, the visual representation of the physical item may be a photograph of a physical item, a digitally generated representation of a physical item, a digital scan of a physical drawing of a physical item, an offer code, a digitally generated pattern relating to a physical object or offer in an electronic marketplace, or any other visual representation which conveys some aspect of a physical item which is available for procurement through an electronic marketplace.

In an example embodiment, a user device utilizes a digital camera to capture a digital image of a physical scene including an item sought for procurement and sends the digital image to the computing device. In another example embodiment, a user device retrieves a digital image taken from a digital camera and stored in the memory of the user device and sends to stored digital image to the computing device. In another example embodiment, a user device utilizing a digital application for e-procurement and requisitions in an electronic marketplace selects a stored digital image or stored data relating to a digital image and sends the stored digital image or data to the computing device. Examples of digital image capture and sending are discussed herein and depicted in detail in FIG. 4 and FIG. 5.

In step 204, according the various embodiments, the server 102 is programmed or configured to determine, based on the item image, digital data comprising one or more search keys, the one or more search keys being associated with one or more aspects of the image data of the visual representation. In various embodiments, the one or more search keys are one or more selections of electronic data which are capable of parsing by a search engine or electronic search application to identify one or more corresponding items available for e-procurement or requisition. In various further embodiments, the determining the one or more search keys comprises generating selections of electronic data in particular formats recognizable by a search engine or electronic search application, such as character strings, search categories, numerical values, color shading values, trade names, search engine identifiers or selectors, or any other format capable of parsing by a search engine.

In various embodiments, the one or more search keys are associated with one or more aspects of the visual representation of the physical item through patterns in the image data. In various further embodiments, the one or more search keys are generated based on patterns in the image data, such as pixel shape patterns relating to a physical object's shape, pixel color patterns relating to a physical object's color, word and letter shapes relating to alphanumeric text representations in the image data, watermarks or symbols in a digital image, or any other aspect of image data which is sufficient to generate a search key corresponding to a procurable item in an electronic marketplace.

In various embodiments, commercial image analysis software may be used to generate image analysis data before the image analysis data is converted to the one or more search keys. Examples of image and video analysis software include AMAZON REKOGNITION® available from AMAZON.COM®. In further embodiments, the image analysis data is generated by supplying the commercial software with the image and modifying returned image analysis data from the commercial software prior to generation of the search keys.

In an example embodiment, image data is sent to an image analysis system to determine one or more patterns inherent in the image data. Patterns in the image data indicate patterns and color schemes known to the image analysis system and match the image data with several likely patterns, shapes, or colors known to the system. In various embodiments the image analysis system may return, along with the image analysis, one or more confidence intervals or likelihood metrics describing a relative probability that an analyzed pattern corresponds to a known pattern.

In various further example embodiments, the returned image analysis data used in a determination for corresponding search keys which correspond to the image data. For example, a database containing previous search key terms corresponding to recognized patterns in image data may be queried based on the results of the image analysis. In various embodiments, only search terms corresponding to image analysis data having a confidence interval above a confidence interval threshold is used in the determination of the one or more search keys. In various embodiments one or more unique search keys are generated in response to receiving the image analysis data. For example, the image analysis system may recognize one or more new words or symbols in received image data and a search key generator may generate search keys corresponding to the new words or symbols to be used in a search.

In various embodiment's a user may manually enter one or more search keys comprising a text or category which will be processed and included in the one or more search keys. For example, a user may manually enter text corresponding to a brand-name or color of an item which they user may be seeking. Alternatively or in addition, a user may enter a category of the item which describes the enterprise or field of use of an item to narrow search results generated by the one or more search keys. In various embodiments, the manually entered search keys are used in conjunction with the generated search keys.

In step 206, according to various embodiments, the server 102 is programmed or configured to send, to a database programmed for storing information associated with a plurality of physical items, the one or more search keys. In various embodiments, the one or more search keys are sent directly to a database to perform a search on the one or more search keys. In various embodiments, the one or more search keys are grouped into one or more queries which are sent to a database. In various embodiments, the one or more search keys are transformed into a format capable of parsing by a search engine.

In various embodiments, in response to receiving the one or more search keys, the database will identify one or more procurable items corresponding to one or more search keys. In various further embodiments, the database will determine one or more groups of digital offers for procurable items corresponding to the one or more search keys which will be sent to a user. In various further embodiments, determining the group of digital offers comprises determining one or more digital offers having a certain degree of correspondence to the one or more received search keys.

In an example embodiment, the one or more generated search keys are sent to a database storing digital offers for procurable physical items and/or digital offers for such items. The database stores descriptors of the items and/or offers which may match to a particular degree with the received search keys. The database may identify one or more digital offers or physical items stored in the database which have a certain degree of similarity with the one or more search keys, indicating that the digital image and the image data are likely related to the offers or items stored in the database.

In step 208, according to various embodiments, the server 102 is programmed or configured to receive, from the database, based on the one or more sent search keys, search result data associated with a subset of the plurality of physical items. In various embodiments, receiving the search result data comprises receiving data corresponding to some result of sending the one or more search keys to the database or performing a search procedure based on the one or more search keys. In various embodiments, the search result data is received by server 102 in response to sending the one or more search keys to the database.

In various embodiments, the search result data is in any format which is capable on conveying one or more digital offers or physical items available for procurement identified by sending the one or more search keys to the database, including, but not limited to, a character string, a LinkedList, an offer array, an HTML page link, and/or a mapped data correlation. In various embodiments, the search results returned are further sorted in a particular order based on a metric. For example, the search results may be sorted in a manner which places results matching a larger number of search keys higher in the order. In various further embodiments, the returned data is rearranged such that parsing the returned data to construct a webpage will cause items with a higher number of matched search keys in a more prominent position within the webpage. In various embodiments, a system parsed a returned string of data. The returned string of data is separated in to multiple string segments and the string segments are rearranged into a new string segment to be used for generating a webpage.

In step 210, according to various embodiments, the server 102 is programmed or configured to generate, based on the search result data, a list of physical items from the subset of the plurality of physical items. In various embodiments, generating the list comprises using the search result data to construct a list of physical items or digital offers in a particular order to be relayed to a user. In various further embodiments, the particular order is determined by a relative confidence interval, the relative confidence interval corresponding to the likelihood that a user-initiated search matches a set of returned items. For example, the confidence interval may be determined by a user feedback system which tracks a user's satisfaction with the items in the returned search initiated in response to the upload of the digital image.

In various further embodiments, the system builds a confidence interval based on a proportion of user's indicated satisfaction with the results of the search. In various embodiments, the confidence interval is based on whether the particular digital offer or physical item matches at least one or more search keys. In various embodiments, the confidence interval is used to improve the search key generation by altering the manner in which search keys are generated when a low confidence interval exists between the items returned and the image searched, or the items returned and the search keys used. In various embodiments, the list is sorted according to the names of items available for procurement in the electronic marketplace. In various embodiments, the list is sorted according to a digital catalog that each digital offer or physical item is a part of.

In various example embodiments, the search result data is used to generate a list of physical items which will be presented to a user to be made available for e-procurement or requisition procedures. The search result data will be sorted according to a relative number of matching terms inherent to each physical item description and the provided one or more search keys. Digital offers for items in the electronic marketplace which correspond to a higher number of search keys will be placed higher in the list, in various embodiments, one or more search keys derived from the image are weighted according to relative confidence interval or metric. For example, the one or more search keys may be parsed for words which appear more frequently in searches and weighted accordingly, wherein terms which are frequently used in system search or which have been more positively rated by users are given higher weights.

In various further embodiments, a number of the one or more search keys are filtered out according to a weight threshold, wherein the weight threshold determines which keys are used in the final search and which are not. In various embodiments, search keys derived from words or text appearing in a digital image are given higher weight than search keys derived in other ways. In various embodiments, two confidence scores are used to determine which search keys are used in the search process. For example, separate confidence score applying to the texts found in an image and applying to keys generated from recognized shapes and/or object in an image may be used to jointly determine which keys should be used in a search and which relative weight may be given to each key.

In step 212, according to various embodiments, the server 102 is programmed or configured to cause displaying, on the hard-computing device, the list of physical items. In various embodiments, displaying the list comprises displaying, on a graphical user interface, the one or more digital offers or physical items available for procurement in a visual list discernable by a human user. In various embodiments, displaying the list comprises displaying one or more aspects related to the digital offers or physical items including, but not limited to, name of the offer/item, price, description, digital pictorial representation, and/or supplying entity in the electronic marketplace. Examples of displaying lists of offers and items are provided herein and depicted in FIG. 7 and FIG. 8.

In various embodiments, not depicted in FIG. 2, the items provided in the list may be in a user selectable format allowing the user to select one of the returned items in the list for procurement or requisition. The selection of the item for procurement or requisition may allow the item to be place in a digital repository or digital "shopping cart" to store one or more items which will be the subject of a procurement or requisition order. In various further embodiments, the items in the digital shopping cart may be sent to one or more users of a digital application to approve a requisition. For example, users of a digital application employing the process discussed above may be part of an organization which will purchase items on behalf of the employees as part of regular work operations. As a result, the employee may create a digital shopping cart of returned items which are approve for purchase in the electronic marketplace by the organization. The organization or an administrator of the organization may approve or deny requisitions represented by digital shopping cart in some aspect of the digital application.

In various further embodiments, placing an item from the list into a digital shopping cart may cause an item recommendation process to begin. An item recommendation process may comprise a generation of additional "recommended" items based on item residing within a digital shopping cart. In various embodiments, the recommended items generated by the recommendation process may comprise digital offers for items listed according to similar aspects to one or more items in the digital shopping cart. For example, a user who has placed one or more items in the digital shopping cart for a requisition may be shown one or more recommended items which have aspects similar to the one or more items in the digital shopping cart. In various embodiments, both the similarity to the items in the digital shopping cart and the search keys from a previous search are used in the recommendation process.

In various embodiments not pictured in FIG. 2, confidence intervals or some other tool of measuring similarity between two entities is used to sort results in the list in a particular order. For example, a confidence interval may be used to determine the degree of similarity between the set of generated search keys and all aspects of an item in the returned list of items. In various further embodiments, a confidence interval corresponds to a percentage of number of search keys in the generated search keys which are matched by a descriptor key in the item list. For example, an item associated with a 60% confidence interval is associated with a number of descriptor keys, 60% of which directly match at least one search key in the generated search keys.

The confidence interval or other metric of similarity may be further based on a enterprise categories or enterprise data corresponding to the field of use or manufacture of an item in the list. For example, items available for procurement from a hardware and tool manufacturer may be associated with categories in the electronic marketplace such as hardware and tools. In various embodiments, the confidence interval is based partly on enterprise data. For example, a item which would normally have a 60% confidence interval based on matching search keys with descriptor keys may have an additional percentage added to the confidence interval based on whether or not the item additionally meets a predetermined enterprise category based on enterprise data associated with the search keys.

In various embodiments not pictured in FIG. 2, search keys may be generated from a previous set of search keys gleaned from a previous search. In various embodiments, search keys may be generated based on a requisition or procurement history of a user. In various embodiments, one or more search keys may be stored in a repository for use in future search processes. In various embodiments, a digital application hosting the process described above may generate recommended search keys for a user to include in a search operation. In various further embodiments, the recommended search keys may be based on previously used search keys, similar search keys to previously used search keys, search keys commonly associated with another generated search key or category, or search keys related to items stored in a digital shopping cart or shopping cart history.

Figure 6:
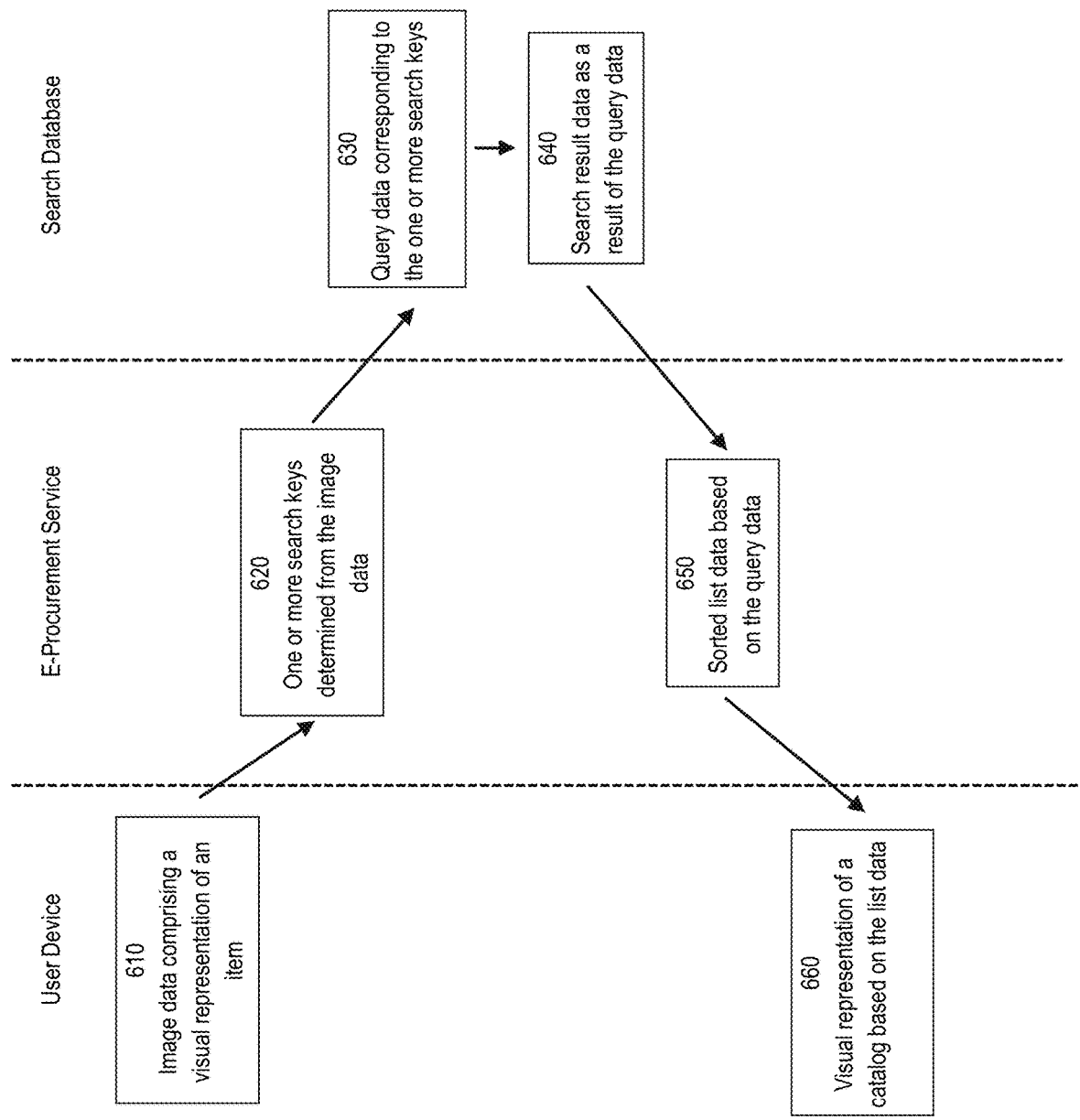
FIG. 6 illustrates a digital image search process according to various embodiments.

FIG. 6 illustrates an example process performed by the e-procurement server 120 computer for performing searches for procurable items on a mobile digital application. FIG. 6 is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 6 illustrates the various data transformation and devices between which data is passed during the process described in FIG. 2. In step 610, according to various embodiments, a user device is programmed or configured to store image data comprising a visual representation of an item. The image data may be received from the internal memory of the user device, created by the user device or received by the user device over a network, such as network 118.

In step 620, according the various embodiments, an e-procurement service such as is programmed or configured to receive the image data from the user device, the image data comprising a visual representation of an item from the user device and generate one or more search keys determined from the image data. In various embodiments, the e-procurement service generates the one or more search keys in response to receiving the image data from the user device. In various embodiments the e-procurement service is a server such as server 120 operating electronic marketplace services for procurement. In various embodiments, the user device send the image data to the e-procurement service as part of a process of e-procurement or requisitioning one or more physical items available in the electronic marketplace.

In step 630, according to various embodiments, a search database such as data source computer 132 is programmed or configured to receive the one or more search keys determined from the image data from the e-procurement service and generate query data corresponding to the one or more search keys. In various embodiments the e-procurement service determines that the user device is attempting to perform a search for items similar to items depicted in the image data, and send the one or more search keys to the search database. In various further embodiments, the search database determines that a search of the databases stored data should be conducted in response to receiving the one or more search keys from the e-procurement service.

In step 640, according to various embodiments, the search database is programmed or configured to use the query data corresponding to the one or more search keys to generate search result data as a result of the query data. In various embodiments, the search database uses the generated query corresponding to the one or more search keys to generate results-oriented search data which can be returned to the e-procurement service. In various further embodiments, the search database generates search data in a format which will indicate to the e-procurement service, which items or offers the search database in currently storing which bear a strong resemblance to the one or more search keys.

In step 650, according to various embodiments, the e-procurement service is programmed or configured to receive the search result data as a result of the query data from the search database and generate sorted list data based on the query data. In various embodiments, the e-procurement service prepares the list based on the relative importance or similarity of the one or more items or offers specified in the search result data. In various embodiment, the e-procurement service may further sort the search result data in a manner which a user may find easily to use, such as placing items or offers with higher rates of correspondence to the search keys higher in the list.

In step 660, according to various embodiments, the user device is programmed or configured to receive the sorted list data based on the query data and generate a visual representation of a catalog based on the list data. The visual representation conveys to a user of the user device a number of offers or items available for procurement in the electronic marketplace through the e-procurement service.

4. Example Environments

Figure 4:
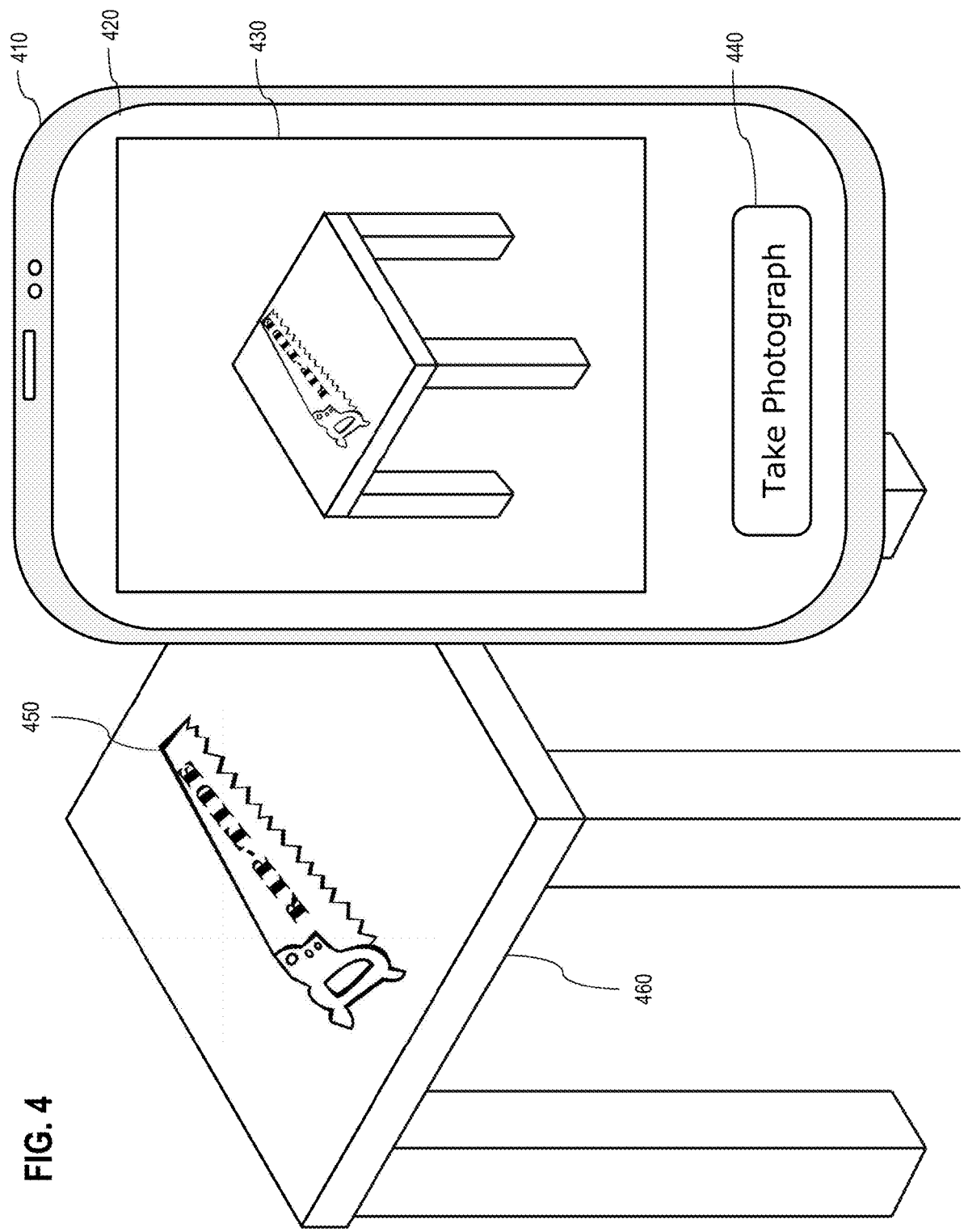
FIG. 4 illustrates a graphical user interface capture of a digital image and corresponding search embodiment.

FIG. 4 illustrates a graphical user interface capture of a digital image and corresponding search embodiment. As depicted in FIG. 4, a mobile device 410 implements a digital application facilitating the example processes described in FIG. 2 and FIG. 6. Mobile device 410 comprises electronic screen 420 for the display of digital information to a user of mobile device 410. As displayed on electronic screen 420, pictorial window 430 depicts a window providing a sample of a digital image that a user may create and store as part of the digital image search process. In various embodiments, an image is taken corresponding to the depiction in pictorial window 430 when photograph creation button 440 is pressed manually by a user of device 410.

As depicted in FIG. 4, pictorial window 430 displays a digital representation of the physical arrangement of handsaw item 450 on top of table item 460. The example in FIG. 4. illustrates a user implementing a digital application on mobile device 410 to engage a search and procure process similar to those depicted in FIG. 2 and FIG. 6. For example, FIG. 4 depicts a user taking a digital picture with a digital camera on mobile device 410. The picture is finalized when the user places the subject of the picture in the frame of pictorial window 430 and presses photograph creation button 440. The user has then created a digital photograph of a table with a RIP-TIDE brand saw on top of the table. The user may be attempting to engage the search process to find a similar RIP-TIDE saw for procurement for requisition purposes. In various embodiments, pressing photograph creation button 440 will automatically engage a digital image search process similar to the process depicted in FIG. 2. For example, by pressing the photograph creation button 440, a user may search an electronic marketplace for a RIP-TIDE brand saw on the corresponding e-procurement digital application and service.

Figure 5:
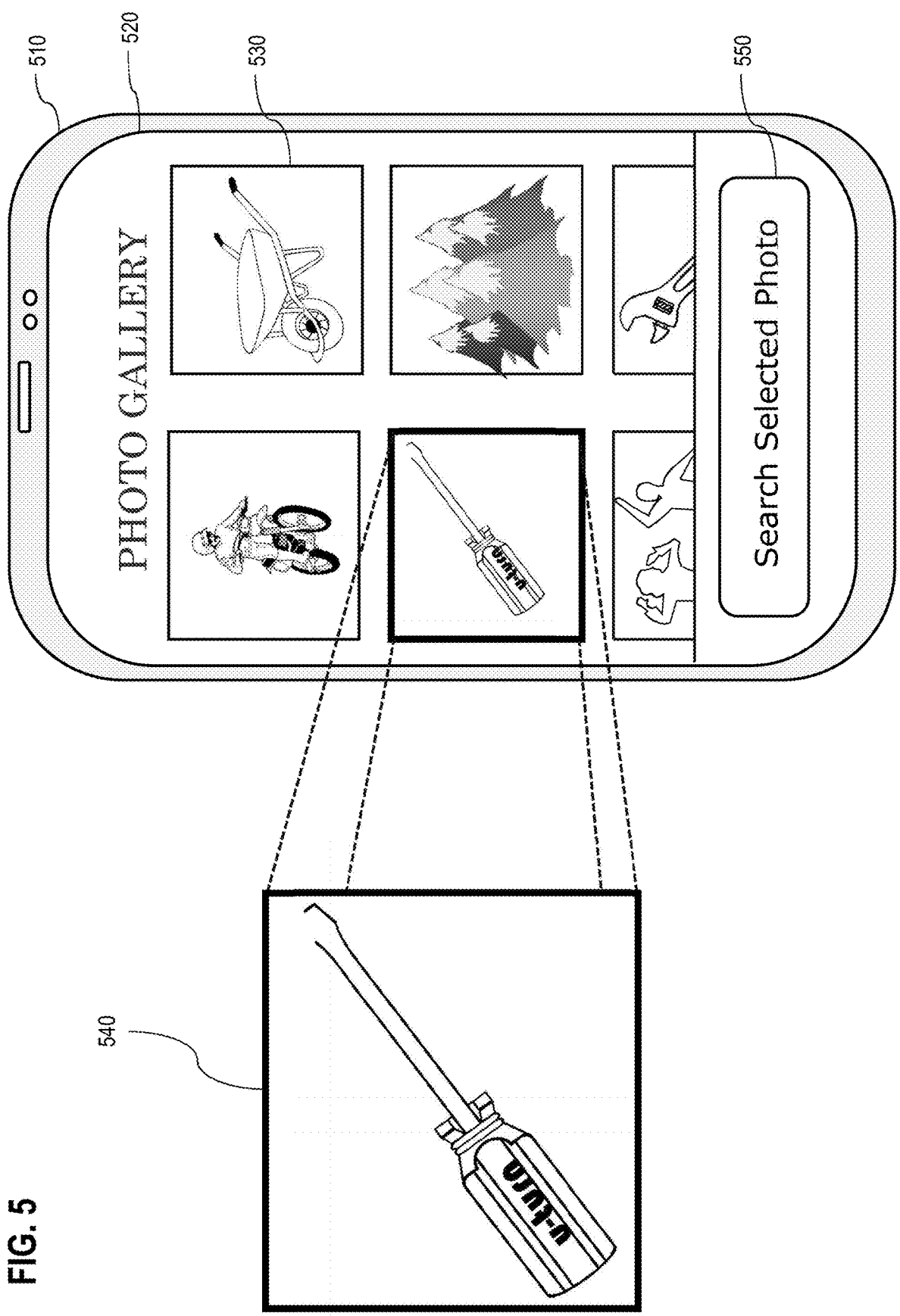
FIG. 5 illustrates a graphical user interface for selection of a digital image and corresponding selection and search embodiment.

FIG. 5 illustrates a graphical user interface for selection of a digital image and corresponding selection and search embodiment. As depicted in FIG. 5, a mobile device 510 implements a digital application facilitating the example processes described in FIG. 2 and FIG. 6. Mobile device 510 comprises electronic screen 520 for the display of digital information to a user of mobile device 510. Stored image 530 depicts an icon corresponding to a digital image stored in memory by mobile device 510. Selected image 540 depicts an icon corresponding to a digital image stored in memory by mobile device 510 having a been manually selected by a user of mobile device 510.

In various embodiments, an image is selected to be used as part of the digital image search process when a storage image is selected as a selected image, and photograph selection button 550 is pressed manually by a user of device 510. As depicted by FIG. 5, a user of mobile device 510 has selected image stored image 540 by highlighting stored image 540. Selection of a stored image may be made by any sufficient input on mobile device 510 including input on a touchscreen. For example, FIG. 5 shows a highlight shadow around selected image 540 indicating that selected image 540 has been chosen by a user. Selected image 540 corresponds to a digital image of a U-TURN screwdriver. By selecting the image and pressing photograph selection button 550 a user may start an image search process for a similar U-TURN screwdriver in an electronic marketplace.

Figure 7:
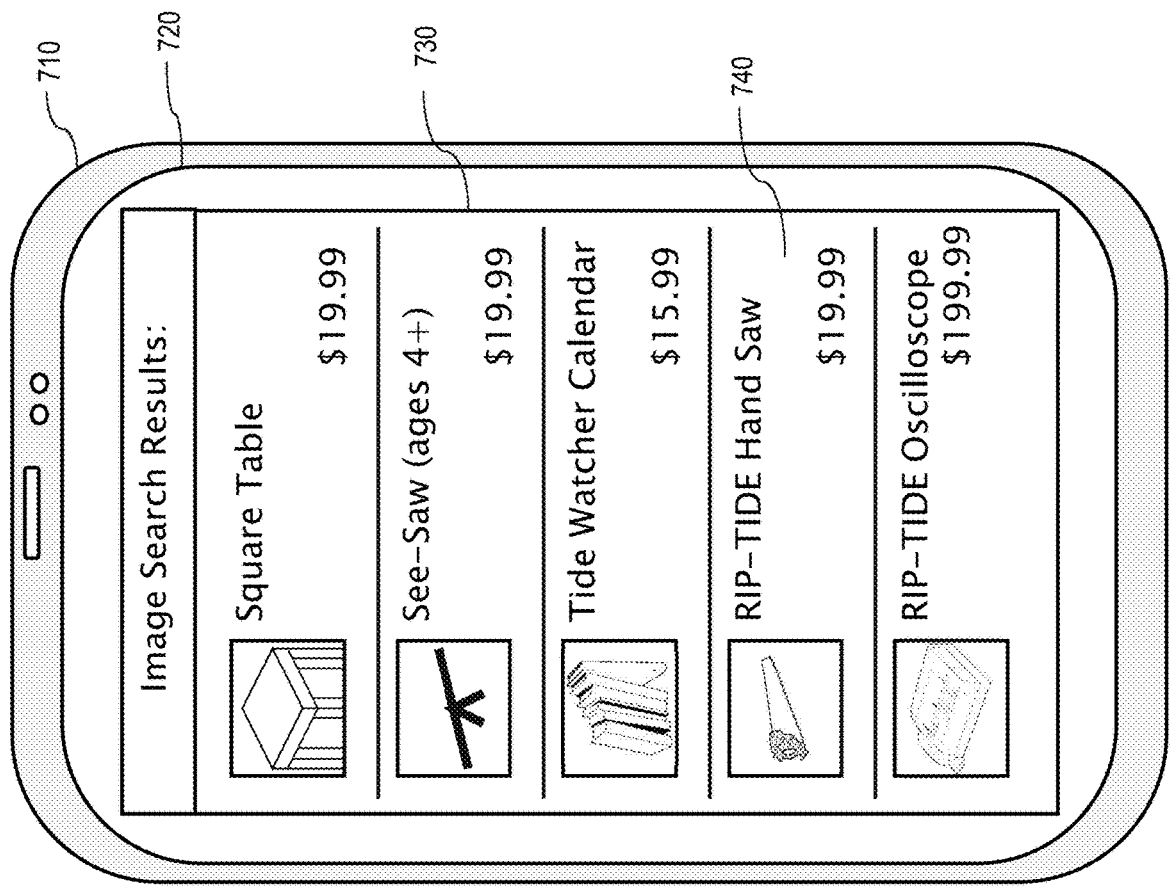
FIG. 7 illustrates a graphical user interface of search results gleaned from a digital image search process.

FIG. 7 illustrates a graphical user interface of search results gleaned from a digital image search process. As depicted in FIG. 7, a mobile device 710 implements a digital application facilitating the example processes described in FIG. 2 and FIG. 6. Mobile device 710 comprises electronic screen 720 for the display of digital information to a user of mobile device 710. Results window 730 depicts a window providing the results of a search using search terms gleaned from information described above and is depicted on electronic screen 720.

As depicted in FIG. 7, results window 730 comprises one or more results item pages 740 corresponding to procurable items identified by the search results. For example, results windows show results of an image search for the RIP-TIDE handsaw depicted in FIG. 4. As depicted in FIG. 7, the image search process has returned multiple instances of items available for procurement, one of which is a listing for a RIP-TIDE handsaw, as seen in item page 740. In various embodiments, FIG. 7 depicts a search result based on the captured image depicted in FIG. 4. For example, in response to receiving the digital image represented in pictorial window 430, the digital application may analyze the image to return a set of search keys for search in an electronic marketplace for procurable items.

The digital image in pictorial window 430 may return analyze object shapes to return keyworks. For example, search key's produced by shape recognition may be search keys such as "saw," "handle," "tool," "table," and/or "wood," corresponding to the physical properties of the items in the image. The digital image in pictorial window 430 may return analyze symbol or text shapes to return keyworks. For example, search key's produced by text recognition may be search keys representing the "RIP-TIDE" logo. The digital application may then conduct a search in an electronic marketplace for the search keys. The returned items may be listed to a user of mobile device 710, and returned for their inspection. For example FIG. 7 lists a square table, a see-"saw", a "tide" watching calendar, a "RIP-TIDE" brand Oscilloscope, or the aforementioned RIP-TIDE saw, among other items.

Figure 8:
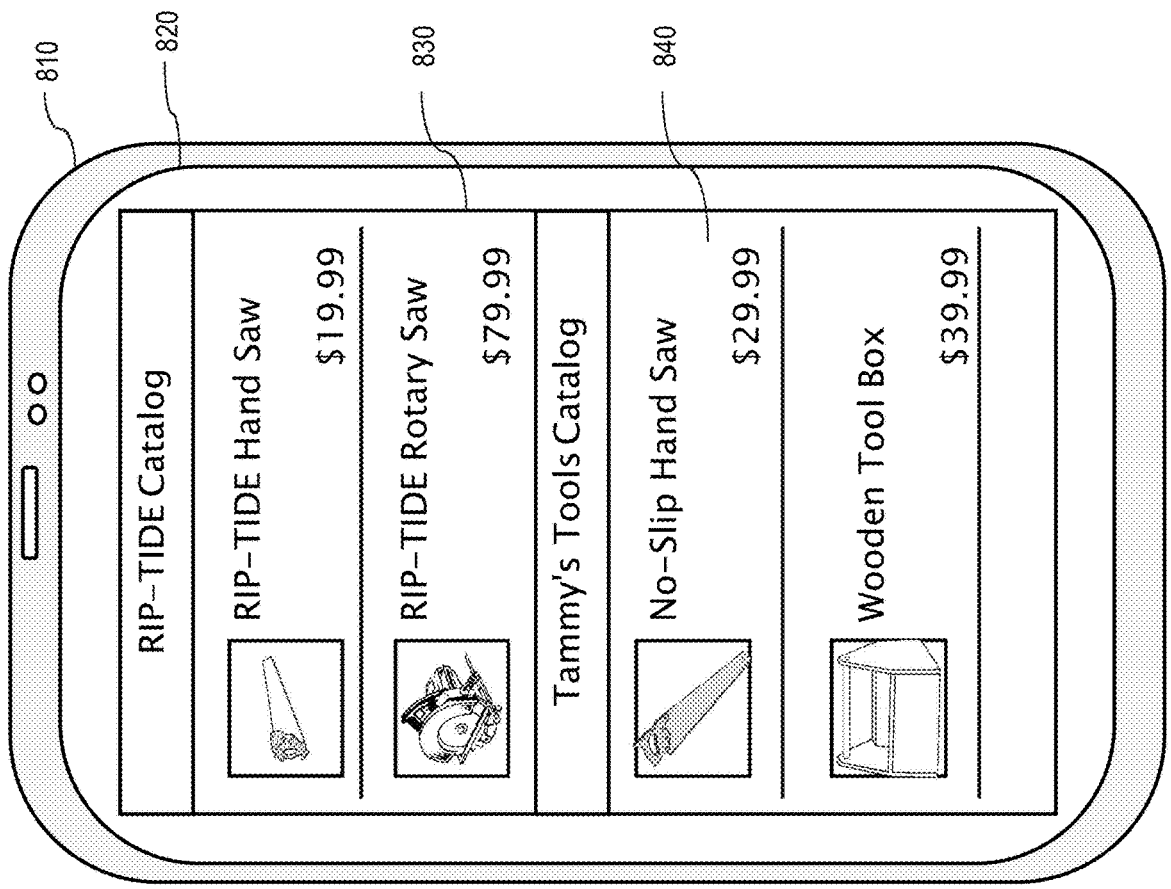
FIG. 8 illustrates a graphical user interface of search results gleaned from a digital image search process and sorted according to a search metric.

FIG. 8 illustrates a graphical user interface of search results gleaned from a digital image search process and sorted according to a search metric. As depicted in FIG. 8, a mobile device 810 implements a digital application facilitating the example processes described in FIG. 2 and FIG. 6. Mobile device 810 comprises electronic screen 820 for the display of digital information to a user of mobile device 810. Catalog window 830 depicts a window providing the results of a search using search terms gleaned from information described above and sorted according to particular criteria.

As depicted in FIG. 8, catalog window 830 comprises one or more catalog item pages 840 corresponding to procurable items identified by the search results and sorted in catalog window 830. Specifically, FIG. 8 depicts the results of the above search discussed with respect to FIG. 7 in a sorted order with catalog listings. In various embodiments, the digital application may sort search results by catalog listing. For example, as depicted in FIG. 8, items bearing the "RIP-TIDE" mark are contained in an independent catalog of "RIP-TIDE" products, which may be hosted by a company or seller selling RIP-TIDE brand products in the electronic marketplace.

In various embodiments, items are further sorted according to search relevance. For example, the digital application executing a process such as the processes of FIG. 2 and FIG. 6 may determine whether one or more items match one or more search key terms to gauge the relevance of each item to a search result. For example, using the generated search key terms discussed above, the digital application may determine that the listing for a RIP-TIDE Hand Saw conforms to multiple search keys, namely "saw," "handle," "tool," "wood," and "RIP-TIDE." The RIP-TIDE Hand Saw is therefore presented first to the user of mobile device 810 on catalog window 830. Other terms which match various aspects of the search keys to lesser degrees may be presented lower in the list. For example, FIG. 8 depicts items such as the RIP-TIDE Rotary Saw, the No-Slip Hand Saw, and the Wooden Tool Box lower in the list than the more relevant RIP-TIDE hand saw.

Figure 9:
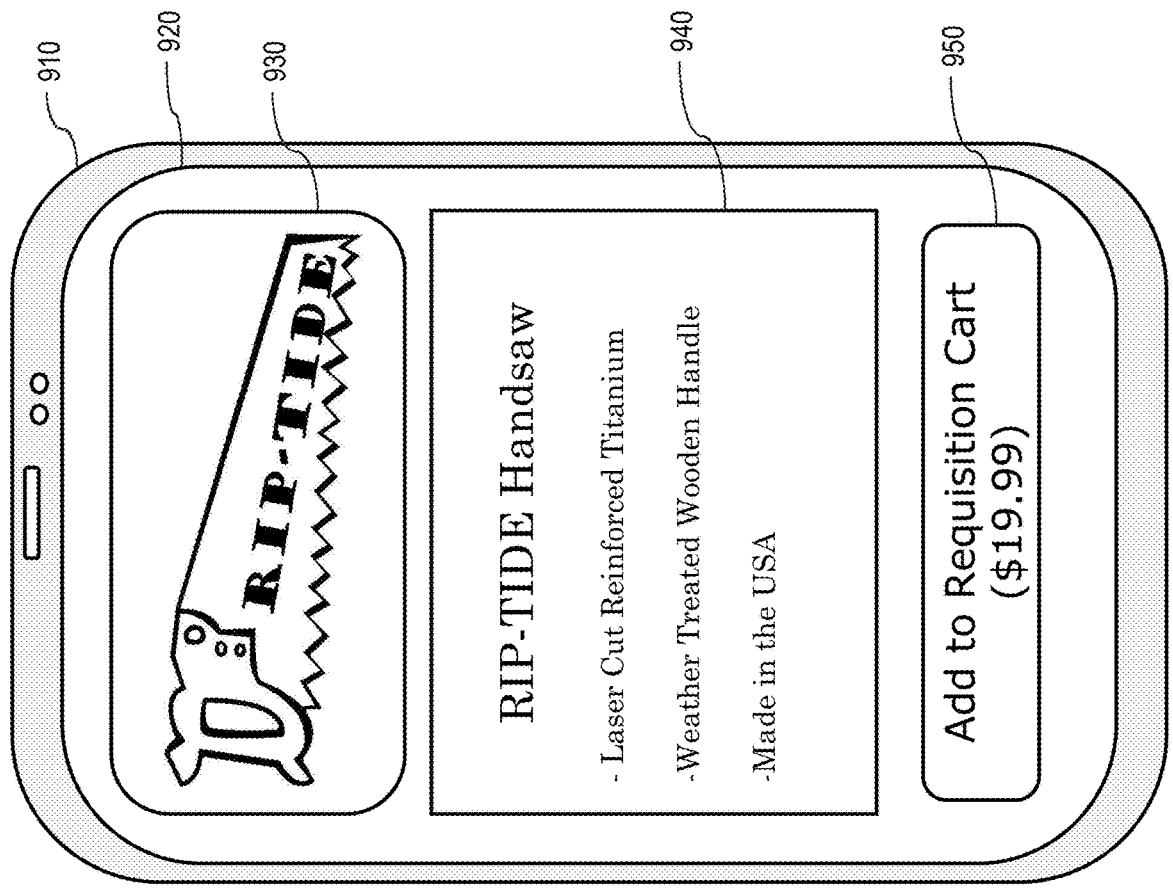
FIG. 9 illustrates a graphical user interface of a requisition process for a digital item listed as part of a digital image search process.

FIG. 9 illustrates a graphical user interface of a requisition process for a digital item listed as part of a digital image search process. As depicted in FIG. 9, a mobile device 910 implements a digital application which may be used for requisitions or procurement processes on a mobile platform. Mobile device 910 comprises electronic screen 920 for the display of digital information to a user of mobile device 910. Product image 930 depicts a digital visual representation of the physical item RIP-TIDE Handsaw available for e-procurement. As depicted in FIG. 9, the product image may be part of an item requisition page found during the execution of the process depicted in FIG. 2 or FIG. 6. For example, FIG. 9 may depict the product requisition mobile page for a RIP-TIDE Hand Saw found by the searches discussed in FIG. 7 and FIG. 8. In various embodiments, a user will arrive at the product requisition mobile page after manually selecting results item page 740 from the available list. In various further embodiments the page may be reached by touching anywhere on the results item page 740 on electronic screen 720. In various embodiments, the results item page may only be reached by manually touching the image included in results item page 740 on electronic screen 720. In various further embodiments, touching the image included in results item page 740 on electronic screen 720 may automatically place the item associated with the item requisition page in a digital shopping cart.

Product description 940 depicts a written description of the physical item RIP-TIDE Handsaw available for e-procurement. Product description 940 may also be part of the aforementioned item requisition page to allow a user of mobile device 910 whether the requisition of a RIP-TIDE Hand Saw would be in their interest. For example, product description 940 may list various aspects of the RIP-TIDE Hand Saw in physical form to allow a user to understand the various aspects of the item which will be requisitioned. In various embodiments, an item is selected to be added to a digital shopping cart when item purchase button 950 is pressed manually by a user of device 910. In various embodiments, the item purchase button 950 may include some text to indicate that the item will be added to a digital shopping cart for requisitions or the properties of the item. For example, FIG. 9 depicts the item purchase button indicating the RIP-TIDE Hand Saw will be added to a digital requisition cart and that the price of the saw for requisition will be $19.99.

Figure 10:
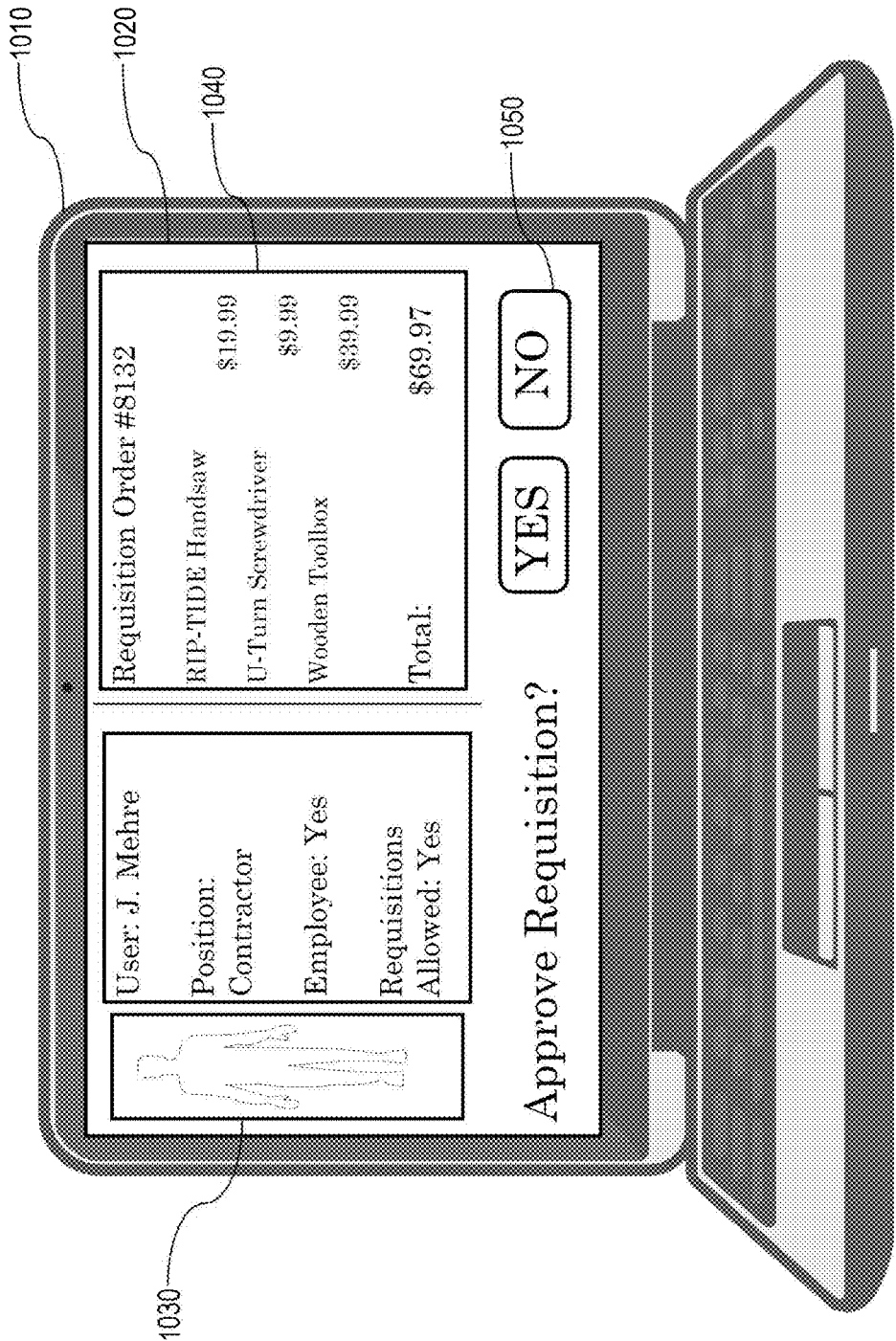
FIG. 10 illustrates a graphical user interface of a requisition approval process for one or more digital items as part of a digital image search and approval process.

FIG. 10 illustrates a graphical user interface of a requisition approval process for one or more digital items as part of a digital image search and approval process. As depicted in FIG. 10, an administrative computing device 1010 implements a digital application which may be used for approving requisitions, such as the requisitions discussed with respect to FIG. 9. Administrative computing device comprises electronic screen 1020 for the display of digital information to a user of administrative computing device 1010. Requisitioner information 1030 is displayed on electronic screen 1020. In various embodiments, requisitioner information 1030 describes aspects of the user making a requisition request to purchase items in an electronic marketplace. For example, as depicted in FIG. 10, requisitioner information 1030 includes various items of information regarding the requisitioner, such as the user's profile, the user's name, the user's position in an organization for which they have requisitioning rights, the user's status as an employee or independent contractor, and/or the user's permission to requisition items in the electronic marketplace.

Item procurement information 1040 is displayed on electronic screen 1020. Item procurement information 1040 may show any aspect of the aforementioned digital shopping cart for requisitions which a user of administrative device 1010 may use to approve or deny requisitions. For example, as depicted in FIG. 10, a digital shopping cart has been filled out of a user of a mobile device and the user has sent in a requisition order. The particular requisition order includes the RIP-TIDE handsaw, a U-Turn Screwdriver, and a Wooden Toolbox. In an example embodiment, the user requisitioning the order depicted in item procurement information 1040 is the same user that took a digital picture of the RIP-TIDE Hand Saw depicted in FIG. 4 and entered the photograph of the U=Turn screwdriver depicted in FIG. 5 to begin the processes depicted in FIG. 2 and FIG. 6. In various embodiments, a group of items in a digital shopping cart is approved or disapproved for requisition by a user of administrative computing device 1010 based on manual input by the user for one of permission buttons 1050. For example, after reviewing both of requisitioner information 1030 and item procurement information 1040, a user of administrative device 1010 may choose to either accept the items for requisition, in which case the items will be bought and supplied to the requisitioned, or denied, in which case no purchase in the electronic marketplace will be made.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
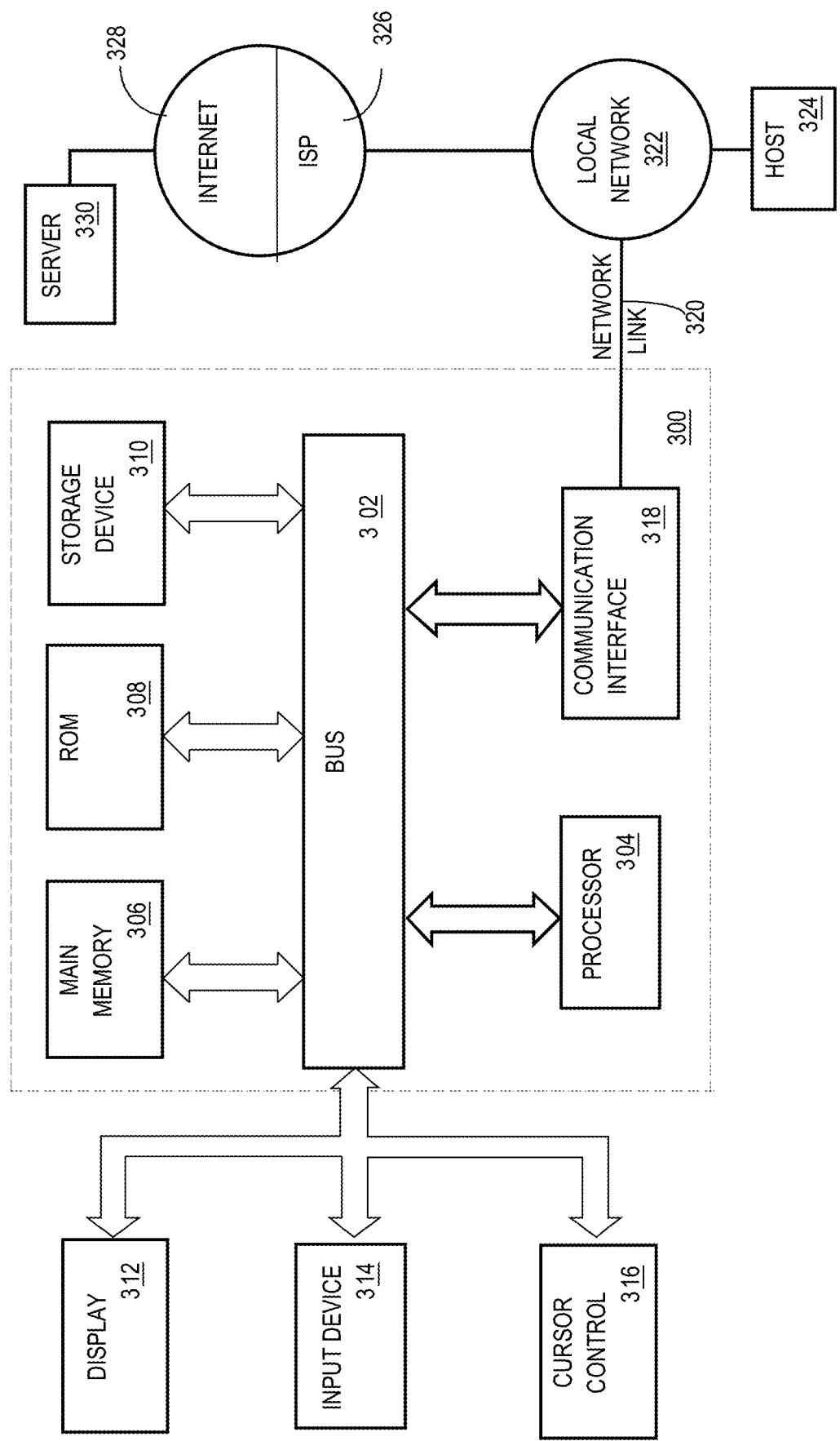
FIG. 3 illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   maintaining, by a digital service running on a first computing device, an electronic data repository comprising one or more stored keys and correspondence data associated with the one or more stored keys;
   receiving, by the digital service running on the first computing device, from a digital application running on a second computing device, an item image that comprises image data comprising, in a digital format, a visual representation of a physical item;
   determining, by the digital service running on the first computing device, one or more patterns of pixels in the item image;
   determining, by the digital service running on the first computing device, confidence values, each of the confidence values being a probability that a pattern of the one or more patterns corresponds to one stored pattern from among a plurality of recognized patterns of pixels stored by the digital service running on the first computing device;
   determining, based on the item image and the electronic data repository, digital data comprising one or more search keys, the one or more search keys comprising one or more image keys and one or more recommended keys, wherein:
      the one or more image keys are determined based on a subset of the one or more first confidence values having a value higher than a confidence threshold value;
      the one or more recommended keys are determined based on the one or more image keys, the one or more stored keys, and the correspondence data; and
      the one or more recommended keys are different than the one or more image keys;
   sending, by the digital service running on the first computing device, to a database programmed for storing information associated with a plurality of physical items, a database query using the one or more search keys;
   receiving, by the digital service running on the first computing device, from the database, based on the one or more sent search keys, a result set of database objects associated with a subset of the plurality of physical items;
   generating, by the digital service running on the first computing device, based on the search result data, a list of physical items from the subset of the plurality of physical items;
   causing displaying, on the second computing device through the digital application, the list of physical items.

2. The computer-implemented method of claim 1, further comprising:
   generating, by an image capture application implemented on the computing device, a digital visual representation of a real-world scene including one or more physical items;
   storing, by the computing device, in a digital memory, as the image data, the digital visual representation of the one or more physical items.

3. The computer-implemented method of claim 1, wherein receiving, by the computing device, further comprising:
   receiving, by the computing device, selection input specifying selection of a digital image from a gallery of multiple digital images stored on the computing device;
   storing, by the computing device, in a digital memory, as the image data, the digital image from the gallery.

4. The computer-implemented method of claim 1:
   the search result data associated with the subset of the plurality of physical items further comprising confidence data, the confidence data corresponding to degrees of similarity between the one or more search keys and each of the physical items in the subset of the plurality of physical items;
   the generating the list of physical items comprising sorting physical items based on the confidence data;
   the displaying comprising displaying items in the list in an order determined by the sorting.

5. The computer-implemented method of claim 1:
   the search result data associated with the subset of the plurality of physical items further comprising enterprise data, the enterprise data corresponding to a category of use for each of the physical items in the subset of the plurality of physical items;
   the generating the list of physical items comprising grouping physical items based on the enterprise data;
   the displaying comprising displaying items in the list in an order based on the enterprise data.

6. The computer-implemented method of claim 1:
   the visual representation of the physical item comprising a visual representation of one or more specific words associated with the physical item;
   the determining of the one or more search keys comprising including the one or more specific words associated with the physical item in the one or more search keys;
   the receiving of the search result data comprising receiving one or more search results having a name including the one or more specific words associated with the physical item.

7. The computer-implemented method of claim 1:
   the visual representation of the physical item comprising a visual representation of one or more specific symbols associated with the physical item;
   the determining of the one or more search keys comprising generating one or more symbol terms from the one or more specific symbols;
   including the one or more specific symbols associated with the physical item in the one or more search keys;
   the receiving of the search result data comprising receiving one or more search results associated with a symbol related to the one or more symbol terms.

8. The computer-implemented method of claim 1, further comprising:
   receiving, by the digital service running on the first computing device, from the digital application running on a second computing device, one or more user keys generated by a user of the digital application;

wherein the one or more search keys further comprise the one or more user keys;

wherein the one or more user keys are different than the one or more image keys and the one or more recommended keys.

9. The computer-implemented method of claim 1, wherein the one or more recommended keys are further determined based on one or more historical keys, the one or more historical keys based on purchase history data stored by the electronic data repository.

10. The computer-implemented method of claim 1, further comprising determining an object confidence interval for each database object in the received set of database object;

in response to determining that each object confidence interval is below an object confidence threshold, determining one or more second recommended keys;

sending, by the digital service running on the first computing device, to the database programmed for storing information associated with a plurality of physical items, a second database query using the one or more search keys and the second recommended keys;

receiving, by the digital service running on the first computing device, from the database, based on the one or more sent search keys and the second recommendation keys, a second result set of database objects associated with a subset of the plurality of physical items;

wherein generating the list of physical items comprises generating a list of physical items based on the second result set of database objects.

11. One or more non-transitory computer-readable media storing instructions which, when executed by one or more processors, cause:

maintaining, by a digital service running on a first computing device, an electronic data repository comprising one or more stored keys and correspondence data associated with the one or more stored keys;

receiving, by the digital service running on the first computing device, from a digital application running on a second computing device, an item image that comprises image data comprising, in a digital format, a visual representation of a physical item;

determining, by the digital service running on the first computing device, one or more patterns of pixels in the item image;

determining, by the digital service running on the first computing device, confidence values, each of the confidence values being a probability that a pattern of the one or more patterns corresponds to one stored pattern from among a plurality of recognized patterns of pixels stored by the digital service running on the first computing device;

determining, based on the item image and the electronic data repository, digital data comprising one or more search keys, the one or more search keys comprising one or more image keys and one or more recommended keys, wherein:

the one or more image keys are determined based on a subset of the one or more first confidence values having a value higher than a confidence threshold value;

the one or more recommended keys are determined based on the one or more image keys, the one or more stored keys, and the correspondence data; and the one or more recommended keys are different than the one or more image keys;

sending, by the digital service running on the first computing device, to a database programmed for storing information associated with a plurality of physical items, a database query using the one or more search keys;

receiving, by the digital service running on the first computing device, from the database, based on the one or more sent search keys, a result set of database objects associated with a subset of the plurality of physical items;

generating, by the digital service running on the first computing device, based on the search result data, a list of physical items from the subset of the plurality of physical items;

causing displaying, on the second computing device through the digital application, the list of physical items.

12. The computer-readable media of claim 11, further comprising instructions which, when executed by one or more processors, cause:

receiving first digital input comprising a selection of a first item from the list of physical items;

storing purchase data associated with the first item in a digital shopping cart.

13. The computer-readable media of claim 12, further comprising instructions which, when executed by one or more processors, cause:

sending a digital representation of the digital shopping cart to a first approval account;

receiving second digital input from the first approval account that the digital representation of the digital shopping cart has been approved;

in response to receiving the second digital input, initiating a digital purchase transaction of one or more commercial items in the digital shopping cart.

14. The computer-readable media of claim 12, further comprising instructions which, when executed by one or more processors, cause:

in response to receiving the first digital input, determining one or more supplemental items from the list of physical items related to the first item;

transmitting, to the computing device, a recommendation to select the one or more supplemental items for storage in the digital shopping cart.

15. The computer-readable media of claim 11, further comprising instructions which, when executed by one or more processors, cause:

generating, by an image capture application implemented on the computing device, a digital visual representation of a real-world scene including one or more physical items;

storing, by the computing device, in a digital memory, as the image data, the digital visual representation of the one or more physical items.

16. The computer-readable media of claim 11, further comprising instructions which, when executed by one or more processors, cause:

receiving, by the computing device, selection input specifying selection of a digital image from a gallery of multiple digital images stored on the computing device;

storing, by the computing device, in a digital memory, as the image data, the digital image from the gallery.

17. The computer-readable media of claim 11:

the search result data associated with the subset of the plurality of physical items further comprising confidence data, the confidence data corresponding to degrees of similarity between the one or more search keys and each of the physical items in the subset of the plurality of physical items;

the generating the list of physical items comprising sorting physical items based on the confidence data;

the displaying comprising displaying items in the list in an order determined by the sorting.

18. The computer-readable media of claim 11:

the search result data associated with the subset of the plurality of physical items further comprising enterprise data, the enterprise data corresponding to a category of use for each of the physical items in the subset of the plurality of physical items;

the generating the list of physical items comprising grouping physical items based on the enterprise data;

the displaying comprising displaying items in the list in an order based on the enterprise data.

19. The computer-readable media of claim 11:

the visual representation of the physical item comprising a visual representation of one or more specific words associated with the physical items;

the determining of the one or more search keys comprising including the one or more specific words associated with the physical items in the one or more search keys;

the receiving of the search result data comprising receiving one or more search results having a name including the one or more specific words associated with the physical items.

20. The computer-readable media of claim 11:

the visual representation of the physical item comprising a visual representation of one or more specific symbols associated with the physical item;

the determining of the one or more search keys comprising generating one or more symbol terms from the one or more specific symbols;

including the one or more specific symbols associated with the physical item in the one or more search keys;

the receiving of the search result data comprising receiving one or more search results associated with a symbol related to the one or more symbol terms.

* * * * *